United States Patent [19]

Funk

[11] Patent Number: 5,041,714

[45] Date of Patent: Aug. 20, 1991

[54] WORKPIECE PROCESSING ARRANGEMENT

[75] Inventor: Gunter Funk, Stuttgart, Fed. Rep. of Germany

[73] Assignee: Robert Bosch GmbH, Stuttgart, Fed. Rep. of Germany

[21] Appl. No.: 599,712

[22] Filed: Oct. 18, 1990

Related U.S. Application Data

[63] Continuation of Ser. No. 269,954, Nov. 10, 1988, abandoned.

[30] Foreign Application Priority Data

Nov. 25, 1987 [DE] Fed. Rep. of Germany ....... 3739862

[51] Int. Cl.⁵ .............................................. B23K 26/04
[52] U.S. Cl. .......................... 219/121.62; 219/121.74; 219/121.83
[58] Field of Search ........... 219/121.6, 121.61, 121.62, 219/121.74, 121.83

[56] References Cited

U.S. PATENT DOCUMENTS 3,485,996 12/1969 Chiou et al. .................... 219/121.62

FOREIGN PATENT DOCUMENTS 8901385 2/1989 European Pat. Off. ........ 219/121.61

Primary Examiner—C. L. Albritton
Attorney, Agent, or Firm—Michael J. Striker

[57] ABSTRACT

The workpiece processing arrangement, especially for surface hardening, has a laser which radiates a substantially monochromatic beam of rays, a deviating mirror provided with a reflecting layer for the beam arranged in the path of the beam for deviating the beam toward the workpiece, a focussing device for focussing the beam and a radiation detector arranged to detect heat radiation from the workpiece heated by the beam and to supply a signal corresponding to an intensity of the heat radiation, this signal being processed for power regulation of the laser. So that heat radiation from inwardly located surfaces on the workpiece can be easily and accurately detected and used to regulate the laser power, the reflecting layer is provided in a multilayer-interference filter with a blocking region for the beam of rays of the laser and with a permeable region for the heat radiation from the workpiece, and the radiation detector is located in the path of the heat radiation passing through the interference filter.

2 Claims, 1 Drawing Sheet

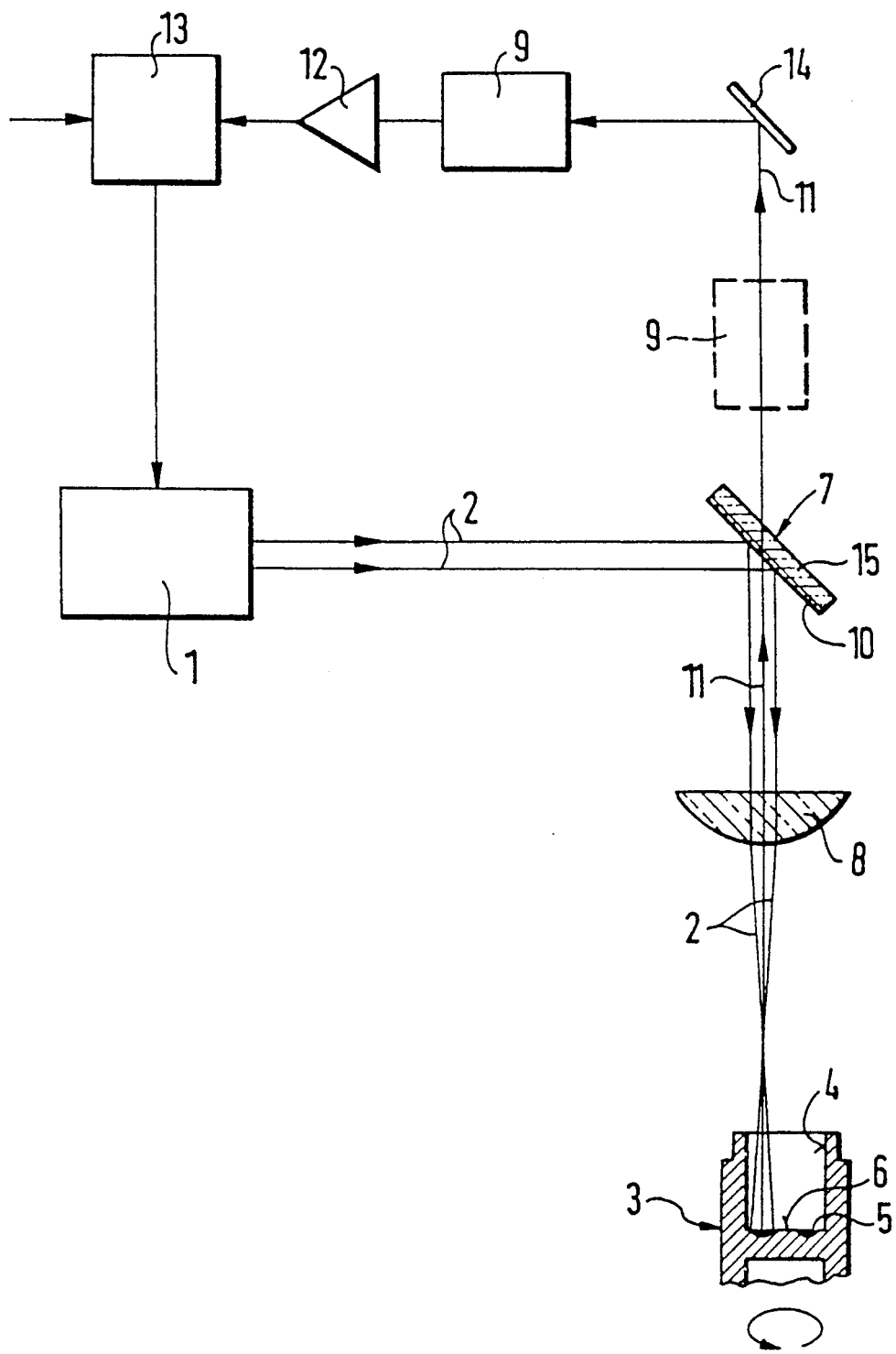

5,041,714

WORKPIECE PROCESSING ARRANGEMENT

This is a continuation of application Ser. No. 269,954, filed Nov. 10, 1988, now abandoned.

BACKGROUND OF THE INVENTION

The present invention relates to a workpiece processing arrangement. More particularly, it relates to a workpiece processing arrangement with the use of a laser and means for directing a laser beam toward a workpiece, as well as a radiation detector for determination of heat radiation from the heated workpiece and adjusting an intensity of the laser.

Arrangements of the above-mentioned general type are known in the art. One of such arrangements is disclosed in the German document DE-OS 2,200,696. In this arrangement an exact direct temperature measurement of a heated region of the workpiece to be processed is performed. For this purpose the arrangement is provided with a radiation detector to determine the heat radiation from the workpiece which is heated with the laser beam, and produces an output signal dependent on the intensity of the heat radiation for controlling the output of the laser beam. The zone to be processed, for example hardened, is heated by a laser beam which is oriented with a deflecting mirror onto the workpiece and has substantially a single relatively great wavelength. The intensity of the heat radiation because of the local heating of the workpiece is measured, and the output of the laser beam is controlled in dependence on the intensity of the measured heat radiation. The heating of the workpiece zone ends when the measured intensity reaches a predetermined threshold value. The laser is either switched off or the laser beam is interrupted by a cover which is arranged in the path of the beam. Thereby good results can be obtained since the workpiece surface is heated no longer and with not higher temperatures than those required for the respective processing. The radiation detector in the known arrangement is arranged so that it directly receives the heat radiation extending from the workpiece. This means that the control the outwardly located zones of a workpiece are processed which can be "seen" by the radiation detector. For processing of the inwardly located surfaces of workpieces, such as for example openings, inner threads and the like, the known arrangement is not suitable or suitably only to a lower degree, since the heat radiation is shielded from the detector by the workpiece.

SUMMARY OF THE INVENTION

Accordingly, it is an object of the present invention to provide a workpiece processing arrangement which is advantageous in that a high energy laser radiation must not pass through additional optical elements for uncoupling of a heat radiation reflected from the workpiece.

It is also an object of the present invention to reduce output losses of a laser radiation to a minimum and to provide the operation of the arrangement substantially independently from a polarization direction of the laser radiation.

Finally, it is also an object of the present invention to provide a simplified arrangement because of absence of additional optical elements.

In keeping with these objects and with others which will become apparent hereinafter, one feature of the present invention resides, briefly stated, in a workpiece processing arrangement in which a reflection coating on a deviating mirror which is arranged in a path of the beam of rays of a laser is permeable for a heat radiation from a workpiece, and a radiation detector is arranged in a path of the heat radiation which has passed through the reflection coating.

When the arrangement is designed in accordance with these features, it attains the above-specified objects.

In accordance with an especially advantageous embodiment of the invention, the reflection coating is formed as a reflection filter which is substantially permeable for the heat radiation extending from the workpiece and substantially impermeable for the radiation with the wavelength of the laser beam.

The reflection filter may be a multilayer-interference filter with a blocking region for the laser radiation and a permeable region for the heat radiation from the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

An alternative method of eliminating some of the disadvantages discussed in the background section has been considered, but never published or otherwise made known to others. In this method a reflector which is permeable for radiation with the wavelength of the laser beam is arranged in the path of the laser beam. This reflector also reflects heat radiation from the workpiece to a radiation detector which is arranged outwardly of the beam path. This arrangement is suitable for temperature controlled or temperature regulated processing both for outer as well as difficult to reach interiorly lying workpiece surfaces using laser radiation with the same accuracy of temperature measurement for both types of surfaces. Each heat treatment process for a workpiece can therefore be performed in a temperature-controlled or temperature-regulated manner with this method also.

BRIEF DESCRIPTION OF THE DRAWING

The single FIGURE of the drawing is a view showing a workpiece processing arrangement in accordance with the present invention.

DESCRIPTION OF A PREFERRED EMBODIMENT

A workpiece processing arrangement in accordance with the present invention includes a laser which is identified with reference numeral 1. The laser is of a known type and produces a beam or rays 2 which has a substantially only one wavelength.

A workpiece 3 with an inner opening 4 to be produced is arranged on a not shown rotatable support. An edge zone 5 of a bottom 6 of the opening 4 is heated by the laser beam 2 for example for surface hardening. A mirror 7 is arranged in the path of the beam of rays 2. It deviates the laser radiation in direction to the workpiece 3. A focussing device which is formed as a collective lens 8 is located between the mirror 7 and the workpiece 3 in the path of the laser beam of rays 2. It projects the beam of rays 2 onto the bottom 6 of the opening 4 or another desired point of the workpiece 3.

The heat radiation which extends from the workpiece 3 during this heating (IR-radiation with a wavelength between 780 nm and 5 μm) is received by a radiation detector 9 which corresponds to the wavelength region of the radiation. For this purpose the deviating mirror 7 arranged in the path of the beam of rays 2 of the laser 1 is provided with a reflection coating 10 which is permeable for the radiation with the wavelength of the heat radiation 11 from the workpiece 3, while it deviates the laser radiation 2 in direction toward the workpiece 3. The radiation detector 9 supplies an electrical output signal which is proportional to the intensity of the heat radiation 11. This output signal after amplification in an amplifier 12 is supplied as an actual value to a regulating circuit 13 which has an output connected with the laser 1. The regulating circuit 13 is designed to maintain the laser output in other words the energy of the ray of beams 2, at a value corresponding to a nominal value which was supplied before to the regulating circuit.

The laser 1 can be for example a carbon dioxide ($CO_2$) laser with a radiation having a wavelength of approximately 10.6 μm. The radiation detectors can be formed as pyroelectric detectors which at the wavelength of between 800 nm to 5 μm have a maximum sensitivity. The wavelength and the intensity of the heat radiation of the workpiece 3 are dependent on its temperature. With a temperature increase, the intensity of the heat radiation increases and its peak wavelength displaces in direction to lower wavelengths. These values however significantly differ from the wavelength of the laser beam of rays 2, which in the event of a $CO_2$-laser has a considerable longer wavelength than the heat radiation of the workpiece 3. It is thereby possible to measure directly the temperatures in the regions in which the workpiece is heated. The workpiece can therefore be brought to the same temperature, independently of the output power of the laser.

In the proposed workpiece processing arrangement that part of the heat radiation 11 is detected and evaluated, which extends coaxially or parallel to the laser beam of rays 2 deviated by the mirror 7. This part of the heat radiation 11 extends through the reflection coating 10 of the deviating mirror 7 and is reflected through a further deviating mirror 14 onto the radiation detector 9. Since the wavelengths of heat radiation 11 and the laser radiation 2 considerably differ from one another, exact separation is possible by means of reflection filter formed by the coating 10. It deviates the oncoming laser radiation in direction toward the workpiece 3, and at the same time is substantially permeable for the heat radiation extending from the workpiece 3. The reflection filter 10 in form of a coating 10 can be formed for example as an evaporated coating on a support which is permeable for the heat radiation 11, for example a glass plate 15. Advantageously, the reflection filter is formed as a multilayer-interference filter with a blocking region for the laser radiation 2 and a permeable region for the heat radiation 11.

The above described workpiece processing arrangement is preferably used for surface hardening of workpieces with the advantage that inwardly located zones, for example openings and the like, can be hardened in a heat-regulated manner. Moreover, the arrangement can be used for cutting or welding of workpieces, in which case the radiation detector 9 serves for orienting the output of the laser 1 to a predetermined nominal value. Both the surface treatment and the joining and separation can be therefore performed with a minimum heat to be used and avoidance of output losses of the laser radiation, while the beam guidance is obtained from a heat regulated treatment of locations which are difficult to reach.

While in accordance with the preferable embodiment the selected laser is a $CO_2$-laser with an output wavelength of between 10.6 μm, it is also possible to use a laser which operates with a different wavelength. For example a YAG-laser can be used with a radiation having a wavelength of approximately 1.06 μm. What is important is that the wavelength of the laser radiation differs from the wavelength of the IR-radiation extending from the heated workpiece 3. The parallel guidance of the heat radiation 11 and the laser radiation 2 makes possible a precise heat treatment on each point of the workpiece which is reached by the laser beam of rays.

The deviating mirror 14 for the heat radiation 11 can be dispensed with, when the radiation detector 9 is located directly above the deviating mirror 7 in the path of the heat radiation 11, as shown in broken lines in the drawing.

It will be understood that each of the elements described above, or two or more together, may also find a useful application in other types of constructions differing from the types described above.

While the invention has been illustrated and described as embodied in a workpiece processing arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a workpiece processing arrangement, especially for surface hardening, comprising a laser which radiates a beam or rays having substantially a single wavelength; means for directing said beam or rays toward a workpiece, said directing means including a deviating mirror arranged in a path of said beam of rays for deviating said beam toward the workpiece and a focussing device for focussing said beam; and a radiation detector for detecting a heat radiation from the workpiece heated by said beam and to supply a signal corresponding to an intensity of said heat radiation, said signal being processed for power regulation of said laser, and said deviating mirror being provided with a reflection layer, the improvement wherein the reflection layer of said deviating mirror is provided in a reflection filter, said reflection filter being substantially permeable for said heat radiation from said workpiece and substantially impermeable for the radiation of said beam of rays from said laser, and wherein said radiation detector is arranged in a path of said heat radiation which has passed through said reflection layer.

2. The improvement as defined in claim 1, wherein said reflection filter is a multilayer-interference filter with a blocking region for said beam of rays of said laser and with a permeable region for said heat radiation from said workpiece.

* * * * *